(12) United States Patent  
DeLuca

(10) Patent No.: US 10,631,052 B1  
(45) Date of Patent: Apr. 21, 2020

(54) STREAMING CONTENT BASED ON RULES FOR WATCHING AS A GROUP

(71) Applicant: International Business Machines Corporation, Armonk, NY (US)

(72) Inventor: Lisa Seacat DeLuca, Baltimore, MD (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/149,482

(22) Filed: Oct. 2, 2018

(51) Int. Cl.  
*H04N 21/472* (2011.01)  
*H04L 29/06* (2006.01)

(52) U.S. Cl.  
CPC ..... *H04N 21/47217* (2013.01); *H04L 63/104* (2013.01); *H04L 65/4015* (2013.01); *H04L 65/4084* (2013.01)

(58) Field of Classification Search  
None  
See application file for complete search history.

(56) References Cited

U.S. PATENT DOCUMENTS

| | | | |
|---|---|---|---|
| 8,661,353 B2 * | 2/2014 | Mattingly | G06Q 10/10 715/706 |
| 9,264,501 B1 | 2/2016 | Story, Jr. et al. | |

| | | | |
|---|---|---|---|
| 2006/0136496 A1 | 6/2006 | Ohashi | |
| 2016/0127766 A1 | 5/2016 | Luk et al. | |
| 2017/0171626 A1 * | 6/2017 | Eatedali | H04N 21/4788 |

OTHER PUBLICATIONS

Cornetto, Cornetto's Commitment Rings, Retrieved from Internet: URL: http://seriescommitment.com/, 2016, 3 pages.

* cited by examiner

*Primary Examiner* — Omar S Parra  
(74) *Attorney, Agent, or Firm* — Schmeiser, Olsen & Watts, LLP; Michael Petrocelli

(57) ABSTRACT

A system and method for preventing a playback of streaming media content from a streaming media server based on a set of rules governing playback between a group of users includes receiving a selection of a media series available for streaming on a streaming media service to be governed by the set of rules, linking each account to define the group of users, receiving a playback request of the media series from a user of the group of users, determining that the playback request is in violation of the set of rules governing playback of the media series, and denying the playback request from the first user of the group by preventing a transmission of data packets to a computing device associated with the account of the user so that the user is prevented from streaming the media series in accordance with the set of rules.

18 Claims, 14 Drawing Sheets

US 10,631,052 B1

STREAMING CONTENT BASED ON RULES FOR WATCHING AS A GROUP

TECHNICAL FIELD

The present invention relates to systems and methods for streaming content based on a set of rules, and more specifically the embodiments of a streaming content playback system for preventing a playback of streaming media content from a streaming media server based on a set of rules governing playback between a group of users.

BACKGROUND

Streaming media services allow users to stream content from a streaming media server to a device for consumption of the content. The content available for streaming often involves a plurality of episodes that comprise a series. New episodes can be gradually released over time, or all episodes can be made available at a given release data. Many times, a group of users orally agree to watch the new episodes together, only to later discover that one or more members of the group watched a new episode without the other members of the group, devaluing a viewing experience of the group watching the new episode together.

SUMMARY

An embodiment of the present invention relates to a method, and associated computer system and computer program product, for preventing a playback of streaming media content from a streaming media server based on a set of rules governing playback between a group of users. A processor of a computing system receives a selection of a media series available for streaming on a streaming media service to be governed by the set of rules, wherein the selection is received from a plurality of users each having an account with the streaming media service. Each account is linked to define the group of users, the group of users including the plurality of users that, by making the selection of the media series, have agreed to playback the media series from the streaming media server according to the set of rules. A playback request of the media series is received from a user of the group of users. The playback request is determined to be in violation of the set of rules governing playback of the media series, and the playback request is denied by preventing a transmission of data packets to a computing device associated with the account of the user so that the user is prevented from streaming the media series in accordance with the set of rules.

DETAILED DESCRIPTION

Conventional media streaming services allow users to stream content from a media server on-demand, regardless if the user has orally agreed with another user to only watch new episode together. Without a mechanism to prevent playback of a media series (e.g. new episode), users can freely "cheat" and watch a newly released episode or a next episode in the series without the other user knowing. Embodiments of the prevent provides a system and method to ensure that a group that agrees to watch a series together can only watch the series when each member of the group is present to prevent a member of the group from streaming new content in a series without the knowledge of the other members of the group.

Figure 1:
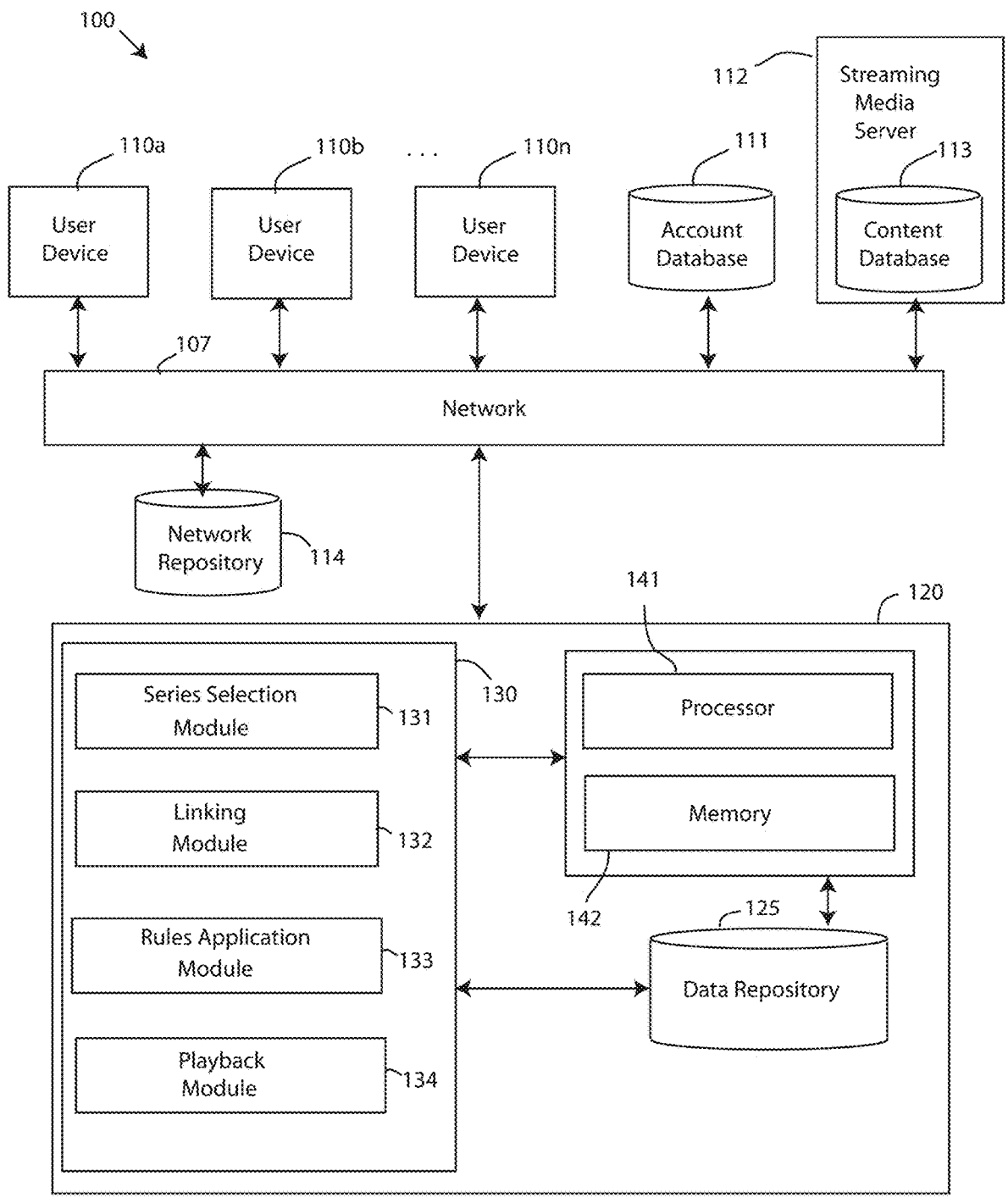
FIG. 1 depicts a block diagram of a streaming content playback system, in accordance with embodiments of the present invention.

Referring to the drawings, FIG. 1 depicts a block diagram of a streaming content playback system 100, in accordance with embodiments of the present invention. The streaming content playback system 100 is a system for preventing a playback of streaming media content from a streaming media server based on a set of rules governing playback between a group of users, so that a transmission of data packets from the media server to a computing device is prevented or allowed based on the set of rules between the group members. The streaming content playback system 100 may be useful for incorporating a group watching feature into conventional streaming media services, wherein the playback between computing devices and streaming media servers is controlled based on a set of rules between a group of users having an account with the streaming media service. In other words, the streaming content playback system 100 prevents transmission of data packets associated with a streaming content stored on a streaming media player to a first computing device based on one or more condition of a separate, second computing device, such as whether the users belonging to the group are all present to view the content.

Embodiments of the streaming content playback system 100 may be alternatively referred to a rule-based playback system, a streaming media group watch system, a streaming service system, a streaming rule-based system for governing playback to a plurality of users in a group, and the like. The streaming content playback system 100 includes a computing system 120. Embodiments of the computing system 120 include a computer system, a computer, a server, one or more servers, a backend computing system, and the like.

Furthermore, the streaming content playback system 100 includes a plurality of user devices 110a, 110b ... 110n, an accounts database 111, a streaming media server 112, and a content database 113 that are communicatively coupled to the computing system 120 over a network 107. For instance, information/data is transmitted to and/or received from the plurality of user devices 110a, 110b ... 110n, the accounts database 111, the streaming media server 112, and the content database 113 over a network 107. In an exemplary embodiment, the network 107 is the cloud. Further embodiments of network 107 refer to a group of two or more computer systems linked together. Network 107 includes any type of computer network known by individuals skilled in the art. Examples of network 107 include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. In one embodiment, the architecture of the network 107 is a peer-to-peer, wherein in another embodiment, the network 107 is organized as a client/server architecture.

In an exemplary embodiment, the network 107 further comprises, in addition to the computing system 120, a connection to one or more network-accessible knowledge bases 114, which are network repositories containing information of the user and user accounts, network repositories or other systems connected to the network 107 that are considered nodes of the network 107. In an embodiment where the computing system 120 or network repositories allocate resources to be used by the other nodes of the network 107, the computing system 120 and network-accessible knowledge bases 114 is referred to as servers.

The network-accessible knowledge bases 114 is a data collection area on the network 107 which backs up and save all the data transmitted back and forth between the nodes of the network 107. For example, the network repository is a data center saving and cataloging user account information, selected series for group watching, and the like, to generate both historical and predictive reports regarding a particular user or a particular user account. In an exemplary embodiment, a data collection center housing the network-accessible knowledge bases 114 includes an analytic module capable of analyzing each piece of data being stored by the network-accessible knowledge bases 114. Further, the computing system 120 can be integrated with or as a part of the data collection center housing the network-accessible knowledge bases 114. In an alternative embodiment, the network-accessible knowledge bases 114 are a local repository that is connected to the computing system 120.

The plurality of user devices 110a, 110b ... 110n is a user computing device. The user computing device can be a computing device, a computer, a desktop computer, a cell phone, a mobile computing device, a tablet computer, a laptop computer, a wearable computing device, a smartwatch, a media streaming device, a smart television, and the like. The user devices 110, 110b ... 110n can include hardware functionality such as a speaker for emitting a sound, a vibration motor for creating vibrations, a display for displaying images, videos, pictorial sequences, etc., a light emitting element for emitting a light, a receiver for receiving communications, a transmitter for transmitting signals, and other similar features and hardware of a computer, smartphone, smartwatch, cell phone, tablet computer, and the like.

Referring still to FIG. 1, the streaming content playback system 100 includes an account database 111. The account database 111 is a database or other storage device maintained or otherwise controlled by a streaming media service, which includes account information/data for a plurality of user subscribers. Each subscriber creates an account with the streaming media service that is stored on the account database 111. The user account information includes user identifying information, payment information, user preferences, one or more profiles, and the like. The account for each user of the streaming media server also includes saved favorite group members for watching a media series as a group. Furthermore, the streaming content playback system 100 includes a streaming media server 112. The streaming media server 112 is configured to transmit data packets associated with a particular content selected for streaming by a user, to a user device, such as user device 110a, 110b ... 100n, for streaming content available on the streaming media service. The streaming media server 112 includes a content database 113. The content database 113 is a database or other storage device maintained or otherwise controlled by the streaming media server, which stores data related to streamable content available for streaming by the streaming media server. For example, the streaming media server 112 accesses the content database 113 to acquire the necessary data for transmitting to user devices 110a, 110b ... 100n over network 107.

Furthermore, the computing system 120 of the streaming content playback system 100 is equipped with a memory device 142 which stores various data/information/code, and a processor 141 for implementing the tasks associated with streaming content playback system 100. A streaming playback application 130 is loaded in the memory device 142 of the computing system 120. The streaming playback application 130 can be an interface, an application, a program, a module, or a combination of modules. In an exemplary embodiment, the streaming playback application 130 is a software application running on one or more back end servers (e.g. computing system 120), servicing one or more user devices 110*a*, 110*b* . . . 110*n*.

The streaming playback application 130 of the computing system 120 includes a series selection module 131, a linking module 132, a rules application module 133, and a playback module 134. A "module" refers to a hardware-based module, a software-based module, or a module that is a combination of hardware and software. Hardware-based modules include self-contained components such as chipsets, specialized circuitry and one or more memory devices, while a software-based module is a part of a program code or linked to the program code containing specific programmed instructions, which is loaded in the memory device of the computing system 120. A module (whether hardware, software, or a combination thereof) is designed to implement or execute one or more particular functions or routines.

The series selection module 131 includes one or more components of hardware and/or software program code for receiving a selection of a media series available for streaming on a streaming media service to be governed by a set of rules. For instance, the series selection module 131 receives, from a plurality of users each having an account with the streaming media service, a selection of a media series to be monitored by the streaming content playback system 100. The media series is content that can be streamed by the plurality of users from the streaming media server 112 of a streaming media service. An embodiment of a media series is an episodic television show. The media series is comprised of a plurality of episodes that are made available by the streaming media service, wherein each episode is individually streamed by the user devices 110*a*, 110*b* . . . 110*n*. The streaming media service includes many different media series that can be selected by the plurality of users. For example, a user can select more than one media series to watch as a group, with different members of the group for each individual media series.

Figure 2:
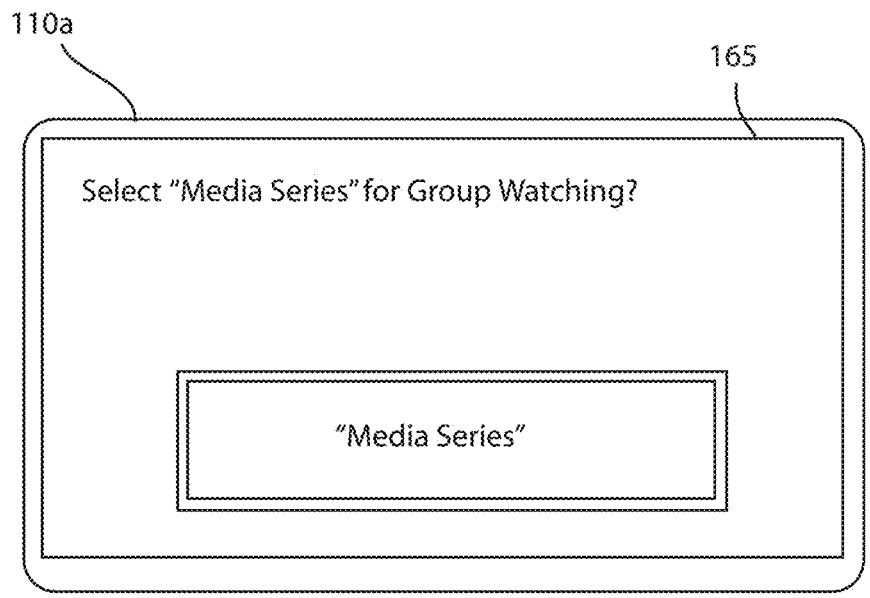
FIG. 2 depicts a graphical user interface of a first user device using a streaming media service application to make a selection of a media series, in accordance with embodiments of the present invention.
Figure 3:
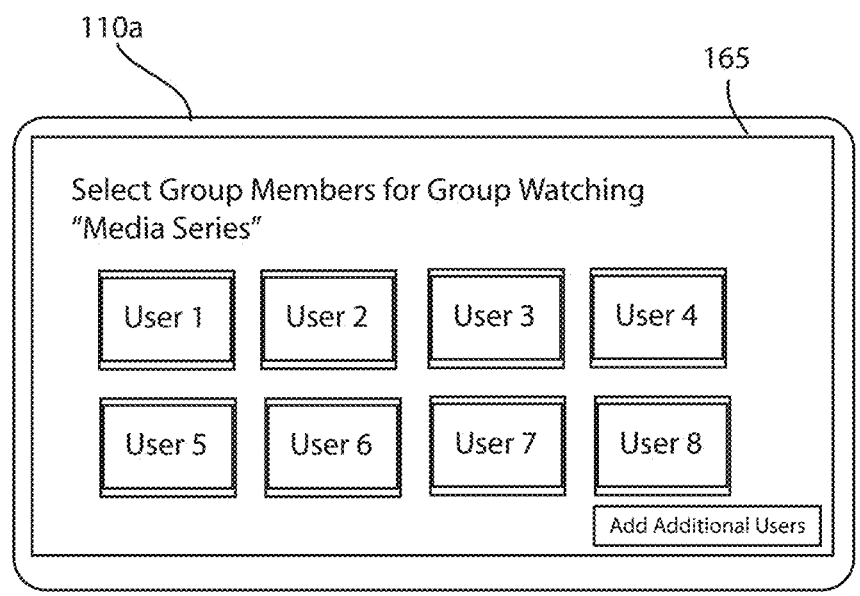
FIG. 3 depicts a graphical user interface of the first user device using a streaming media service application to add users to a group, in accordance with embodiments of the present invention.

Moreover, the series selection module 131 enables a function on the streaming media service to select a media series for group watching and invite other users to be a member in a group of users. FIG. 2 depicts a graphical user interface 165 of a first user device 110*a* using a streaming media service application to make a selection of a media series, in accordance with embodiments of the present invention. For instance, the series selection module 131 enables a user operating the first user device 110*a* to select a media series for group watching. As shown in FIG. 2, the user desires to watch "Media Series" with at least one other person. The graphical user interface 165 of the first user device 110*a* provides the user with an option to confirm the selection of "Media Series" for group watching. Additionally, the series selection module 131 enables a function of the streaming media service to select other users to become members of a group watch the media service selected by the user. FIG. 3 depicts a graphical user interface 165 of a first user device 110*a* using a streaming media service application to add users to a group, in accordance with embodiments of the present invention. For instance, the graphical user interface 165 displays a number of other users that the user may want to add or otherwise include to a group for group watching "Media Series." The graphical user interface 165 displays a number of selectable icons representing other users that the user can select to add to a group. In an exemplary embodiment, the series selection module 131 accesses the account database 111 to obtain a list of users to present as an option to include, which can be based on a favorites list, a past group history, or users within a geographical proximity to the user at a selection time. Additionally, the series selection module 131 can communicate with a social media platform to pull a list of social media contacts (e.g. social media "friends") that share the same interests as the user, or are in a relationship with the user, to populate the graphical user interface 165 of the first user device 110*a* with potential selectable users to be a part of the group agreeing to watch the media series as a group. Further, the series selection module 131 enables a functionality for the user to manually input/add users for inclusion into a group for watching the media series.

Figure 4:
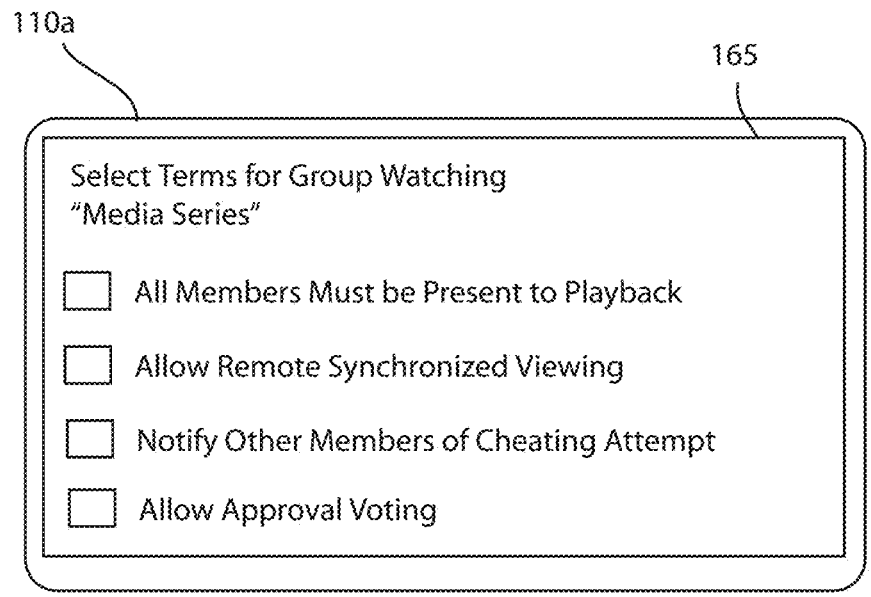
FIG. 4 depicts a graphical user interface of the first user device using a streaming media service application to adjust rules for governing playback of a media series, in accordance with embodiments of the present invention.

Furthermore, the series selection module 131 enables a function for selecting one or more key terms that will form the rules governing the playback of the media series. For instance, the series selection module 131 displays one or more rules, provisions, terms, features, etc. that form the set of rules governing the manner in which the streaming content playback system 100 controls the playback of the media series to the various devices. In an exemplary embodiment, the set of rules includes a rule that each of the plurality of users of the group of users must simultaneously view the media series together. The set of rules includes other rules, such as whether members of the group can override a playback denial, whether all members must be present or at least majority of members are present, whether members should be notified of a user attempting to playback an episode in violation of the set of rules, whether a member that has violated the rules can ask for approval, and the like. Other rules can be incorporated into the set of rules selectable by the user or added by invited users. FIG. 4 depicts a graphical user interface 165 of a first user device 110*a* using a streaming media service application to adjust rules for governing playback of a media series, in accordance with embodiments of the present invention. The graphical user interface 165 displays multiple different rules, provisions, terms, etc. that can be optionally selected to define the set of rules for governing the playback of the media series for the members of the group. The series selection module 131 receives the user selections of the terms for defining the set of rules, and then generates an invitation to be sent to the invited users.

Figure 5:
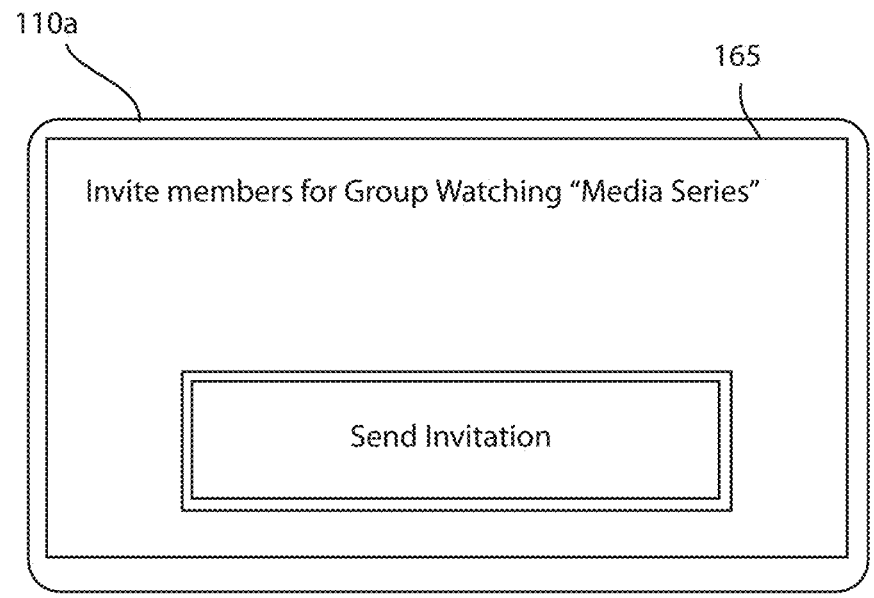
FIG. 5 depicts a graphical user interface of the first user device using a streaming media service application to invite users to a group for watching a media series, in accordance with embodiments of the present invention.
Figure 6:
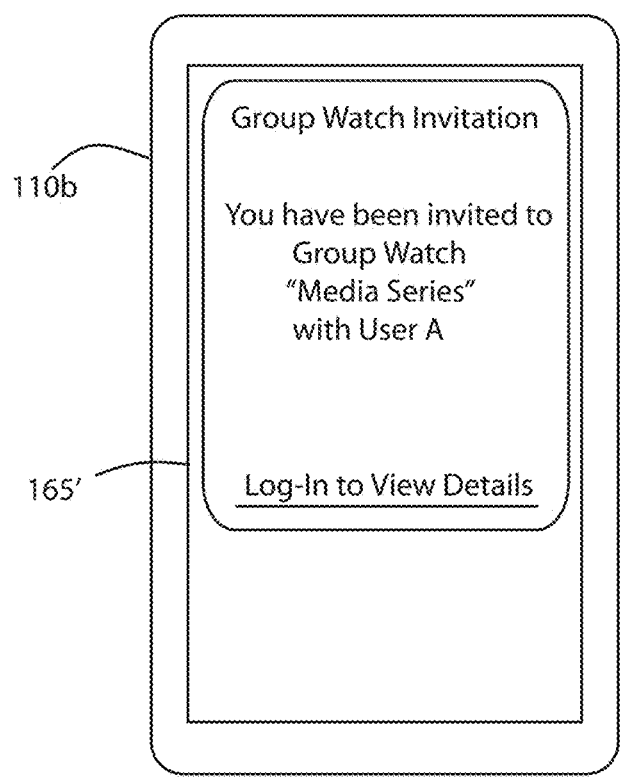
FIG. 6 depicts a graphical user interface of a second user device using a streaming media service application to interact with a group watch invitation, in accordance with embodiments of the present invention.
Figure 7:
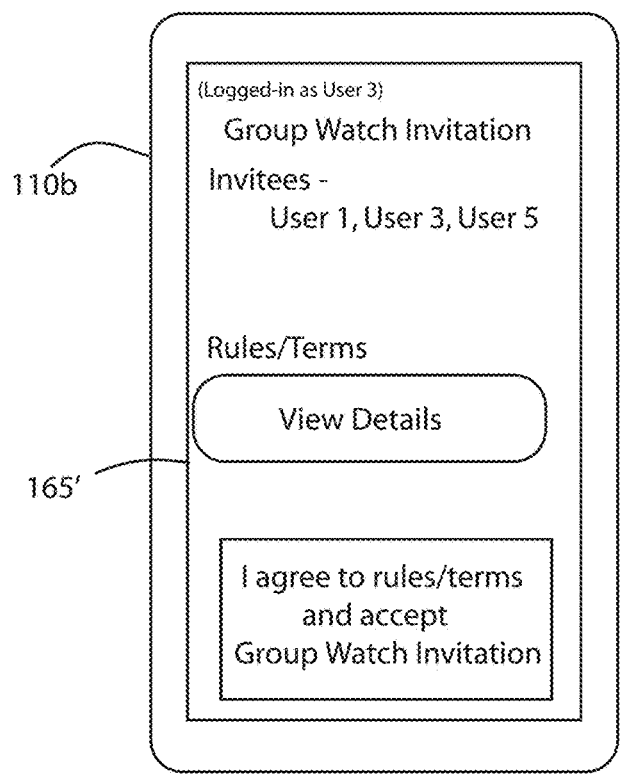
FIG. 7 depicts a graphical user interface of the second user device using a streaming media service application to review details of the invitation and agree to the rules of the group watch, in accordance with embodiments of the present invention.

FIG. 5 depicts a graphical user interface 165 of a first user device 110*a* using a streaming media service application to invite users to a group for watching a media series, in accordance with embodiments of the present invention. For instance, the series selection module 131 transmits the invitation to the invited users via a message, notification, email, direct message, text message, and the like. In an exemplary embodiment, the series selection module 131 sends a notification or message to the account of the invited user on the streaming media service, such that the invited user receives a notification that the invited user can interact with to launch the streaming media service application. FIG. 6 depicts a graphical user interface 165' of a second user device 110*b* using a streaming media service application to interact with a group watch invitation, in accordance with embodiments of the present invention. The notification displayed on the graphical user interface 165' includes a link to go directly to the invitation sent by the series selection module 131. The notification in FIG. 6 states, "Group Watch Invitation. You have been invited to Group Watch 'Media Series' with User A." In addition, the notification shown in FIG. 6 includes a link to "Log-in and View Details." The invited user, or second user in this example, interfaces with the graphical user interface 165' to view the details of the group watch invitation for a particular media series, as created by the first user. FIG. 7 depicts a graphical user interface 165' of the second user device 110b using a streaming media service application to review details of the invitation and agree to the rules of the group watch, in accordance with embodiments of the present invention. The second user (e.g. invited user) can view the details of the other users that have been invited by the first user to be a part of the group, and the specific rules, terms, provisions, etc. governing the playback of the media series. The second user, and the other invited users, interface with the graphical user interface to accept the group watch invitation and agree to the terms of the group watch.

Accordingly, in an exemplary embodiment, the selection received by the series selection module 131 includes the initial request to establish a group watch for a media series and the confirmation from the invited users. In an alternative embodiment, a plurality of users that desire to form a group for watching a media series, can log into the users' accounts and each individually select a media series that the users would like to watch as a group. The users selecting the same media series for group watch with the same users are then grouped together to form a group without the need to send an invitation or notification to the other users.

Referring back to FIG. 1, the computing system 120 includes a linking module 132. The linking module 132 includes one or more components of hardware and/or software program code for linking each account to define the group of users. For instance, the linking module 132 links the accounts of the users that have accepted an invitation to group watch a media series with other users or that have selected the media series to be subject to rules governing the playback of the media series between the members of the group. The accounts are linked so that an activity of one member can be tracked by other members of the group. Linking further enables synchronized viewing of the media series when all members are present and ready to watch the media series, but are not in a same physical location. In an exemplary embodiment, the linking module 132 augments a graphical user interface of each user device to show the number of groups that the user is a member of, as well as information regarding the activity of the other members of the group. The graphical user interface also includes scheduling information, such as an agreed upon time to view an episode, or a messaging platform to allow the members to chat using the streaming media service application to determine an agreeable time to view an episode. Moreover, the linking module 132 optionally links the computing devices that are associated with the account of the users. Linking the devices also can further enable the synchronized viewing of the media series, as well as generate and potentially share data, location, activity, etc. across the linked devices. The group of users includes the plurality of users that, by making the selection of the media series (e.g. invitation and acceptance of terms, with respect to a media series on a media streaming service), have agreed to playback the media series from the streaming media server according to the set of rules.

The computing system 120 also includes a rules application module 133. The rules application module 133 includes one or more components of hardware and/or software program for receiving a playback request of the media series from a user of the group of users, and determining that the playback request is in violation of the set of rules governing playback of the media series. In response to linking the group member's accounts on the social media streaming service, the media series is protected from unauthorized playback of an episode of the media series. When one of the members initiates a playback request, the rules application module 133 receives the playback request from the computing device connected to the streaming media service. For example, if User A operating user device 110a attempts to watch a new episode of "Media Series," the rules application module 133 receives the request and applies the rule-based framework to the playback request of the new episode to ensure that User A is not in violation of the rules agreed to by the group members. First, the rules application module 133 determines whether the episode is an episode that has been previously watched by the group. If the episode has been previously watched, then the rules application module 133 would allow the playback request because the set of rules allows users/members of the group to re-watch previously watched episodes. If the episode is a new episode and/or an episode of the media series that has not been previously watched by the group, then the rules application module 133 progresses to the next stage of applying the set of rules.

Another rule of the set of rules is that each of the plurality of users of the group of users must simultaneously view the media series together. Therefore, in response to receiving the playback request from User A and determining that the episode has not been previously watched by the group or otherwise approved to be watched, the rules application module 133 determines whether the playback request violates the rule that all members of the group of users must be present to allow playback. In an exemplary embodiment, the rules application module 133 determines that the playback request from the first user (e.g. User A operating device 110a) is in violation of the set of rules by detecting that at least one user in the group of users is not present to simultaneously view the media series being requested by the first user. As an example, at least one user in the group of users is not present when a computing device associated with the account of the at least one user in the group is in a different physical location as the user requesting playback, and is not logged in and ready to view the media series in the different physical location. In other words, if one or more users that are members of the group watch for the media series is not physically present in the same room as the device requesting playback, then the rules application module 133 next checks to see if the user not physically present is logged in and ready to remotely watch the media series using existing synchronized remote streaming viewing technologies.

There are several methods to determining whether a user/member is physically located in a same location as the requesting device. In an exemplary embodiment, the rules application module 133 obtains a location information from each computing device 110a, 110b . . . 100n associated with the accounts of the plurality of users of the group of users. Location information of the computing device can be obtained by sending a request to each computing device to transmit a GPS signal to the computing system to determine a location of the computing device. In another embodiment, the computing system 120 can communicate with an intelligent location-based technology interface to obtain or otherwise receive micro-location data of the user devices 110a, 110b . . . 110n. The intelligent location-based technology interface may be a component of the computing system 120, or may be external to the computing system 120, and connected to the computing system 120 over network 107. The micro-location data for each computing device is used to determine a precise location of the computing device within an environment. In another embodiment, the location information or presence of the user is captured using one or more cameras. For example, a camera positioned within an environment (e.g. living room) uses facial recognition to detect that a user is present in the same environment. The camera can be a fixed camera device positioned within the environment, or can be a camera application and camera hardware of the user device 110a, 110b . . . 110n. Each user can use the user's own smartphone to take a photograph (e.g. selfie) with a common reference point in the picture, or one user can take a single photograph of all of the user's in the same environment. In yet another embodiment, each user can log into the account of the media streaming service and confirm that the user is located in the same environment. The individual confirmation can be combined with another presence detection method. For example, a user can check in on the media streaming service website/application, while also submitting a photograph from the environment that includes metadata regarding the GPS location of where the photograph was taken. The other users' photographs can be compared so that the metadata location information corresponds within a predetermined proximity to the other users' location information. Other presence detection technologies can be used to determine a location of each of the users of the group and/or the users' computing devices.

Further, the rules application module 133 ascertains or otherwise determines whether the location information of the computing device(s) associated with the account(s) of the at least one user in the group is outside a predetermined proximity to other computing devices associated with other users in the group. For instance, in response to obtaining the location information, which includes only location data, the rules application module 133 calculates a proximity from the computing device that requested playback. The proximity is a measurable distance from the requesting device. As an example, the predetermined proximity is 100 feet or less. If one or more computing device associated with a member of the group is outside the predetermined proximity, then rules application module 133 concludes that all of the plurality of users in the group are not in a same location to simultaneously view the media series together.

Figure 8:
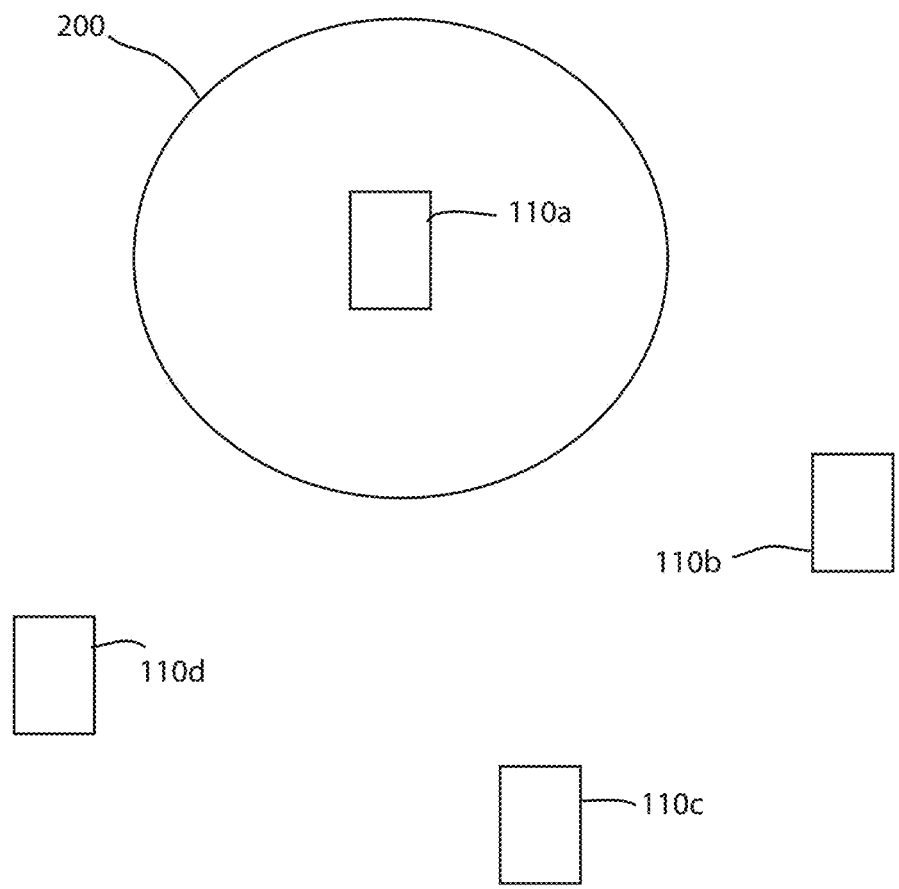
FIG. 8 depicts a first schematic diagram of a predetermined proximity being applied around the requesting device, in accordance with embodiments of the present invention.
Figure 9:
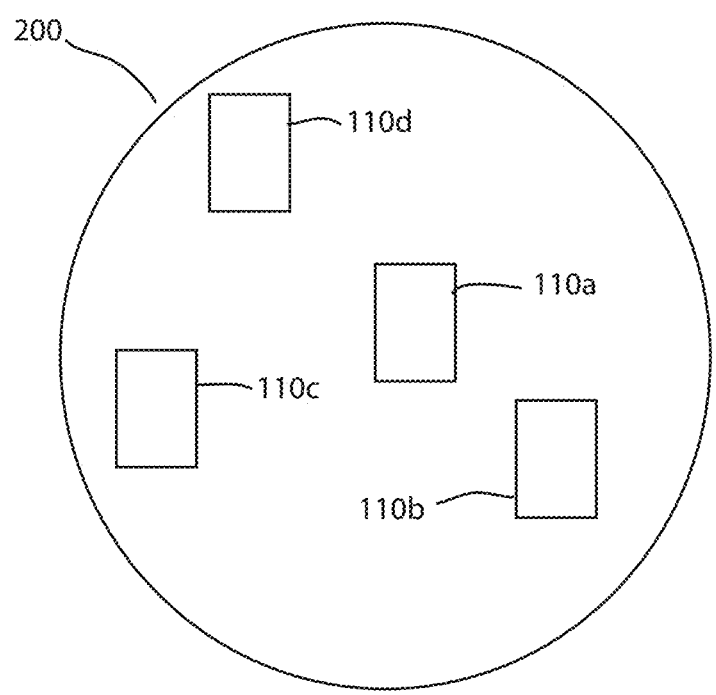
FIG. 9 depicts a second schematic diagram of a predetermined proximity being applied around the requesting device, in accordance with embodiments of the present invention.

FIG. 8 depicts a first schematic diagram of a predetermined proximity 200 being applied around the requesting device 110a, in accordance with embodiments of the present invention. In the example shown in FIG. 8, user devices 110a, 110b, 110c, 110d are computing devices associated with User A, User 1, User 3, and User 5, respectively, whom are members of the group. User A has requested playback of a new episode, and the rule applications module 133 calculates a distance from the requesting device (i.e. user device 110a) and determines whether all of the user devices of the remaining group members 110b, 110c, 110d are located within the predetermined proximity 200. In this example, the user devices 110b, 110c, and 110d are located outside of the predetermined proximity 200 measured from the requesting device 110a. Thus, the rules application module 133 confirms that all members are not present in the same location for simultaneously viewing the episode that the user device 110a requested to play. FIG. 9 depicts a second schematic diagram of a predetermined proximity 200 being applied around the requesting device 110a, in accordance with embodiments of the present invention. In the example shown in FIG. 9, user devices 110a, 110b, 110c, 110d are computing devices associated with User A, User 1, User 3, and User 5, respectively, whom are members of the group. User A has requested playback of a new episode, and the rule applications module 133 calculates a distance from the requesting device (i.e. user device 110a) and determines whether all of the user devices of the remaining group members 110b, 110c, 110d are located within the predetermined proximity 200. In this example, the user devices 110b, 110c, and 110d are located within the predetermined proximity 200 measured from the requesting device 110a. Thus, the rules application module 133 confirms that all members are present in the same location for simultaneously viewing the episode that the user device 110a requested to play.

Figure 10:
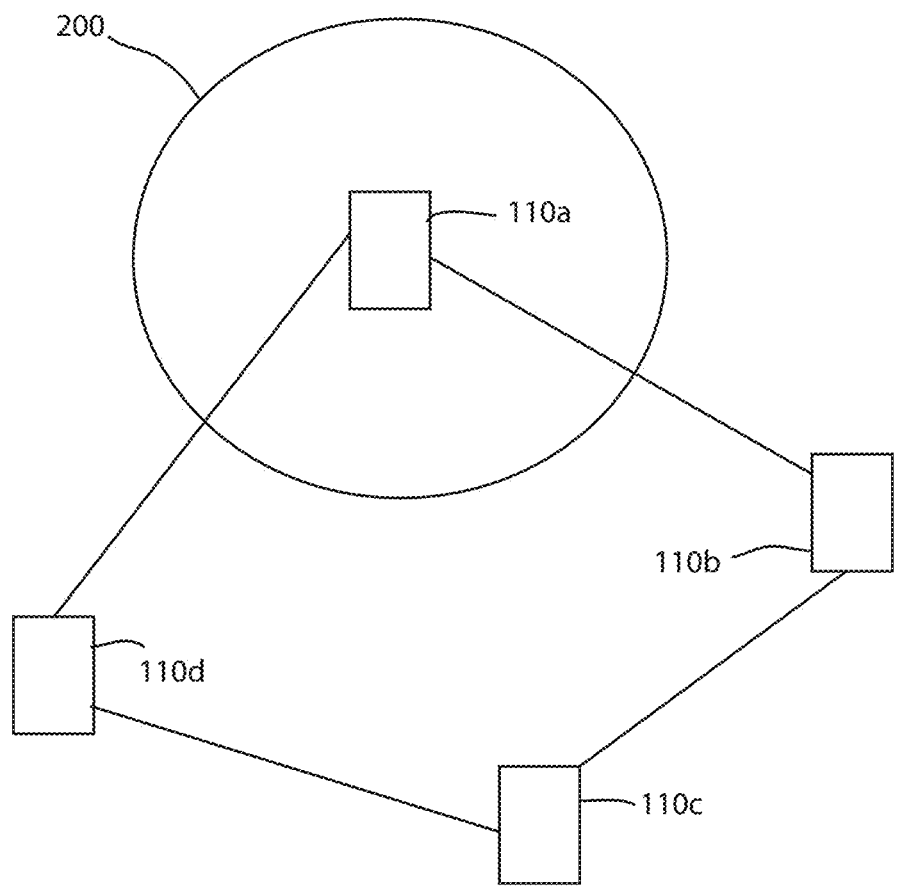
FIG. 10 depicts a schematic representation of a plurality of user devices being synchronized for remote viewing, in accordance with embodiments of the present invention.

In a further embodiment, the set of rules allow some users to not be physically located within the predetermined proximity if the users not located in the same location are remotely viewing the episode simultaneously. For example, the users not in the same room (e.g. living room) can be considered present if those users are logged in and ready to view a synchronized streaming of the episode. There are several methods that can be used to determine whether a remote user is set up for synchronized remote viewing. In an exemplary embodiment, the rules application module 133 checks an account login status for each account, wherein the account login status indicates whether the plurality of users are logged in and ready to view the media series. If the user is not logged in to the account or otherwise has the media streaming service application open on the user device, then the rules application module 133 concludes that the user is not ready for remote viewing. In the event that a user setting is that the user is always logged in, then the rules application module 133 determines whether the user has the media streaming service application on the user device 110a, 110b, 110c, 110d. FIG. 10 depicts a schematic representation of a plurality of user devices 110b, 110c, 110d being synchronized for remote viewing, in accordance with embodiments of the present invention. As shown schematically in FIG. 10, the user devices 110a, 110b, 110c, and 110d are synchronized together for remote viewing of the episode selected for playback, even though user devices 110b, 110c, and 110d are outside the predetermined proximity. If the user devices 110a, 110b, 110c, 110d are not synchronized (e.g. User 3 is not logged in or using the application at the moment of the requested playback), the rules application module 133 ascertains that a computing device associated with an account of the at least one user in the group is not logged in and ready to view the media series, based on the account login status of the computing device associated with the account of the at least one user in the group. The computing device not being logged in indicates that all of the plurality of users in the group are ready to simultaneously view the media series together, which is a violation of the set of rules.

Figure 11:
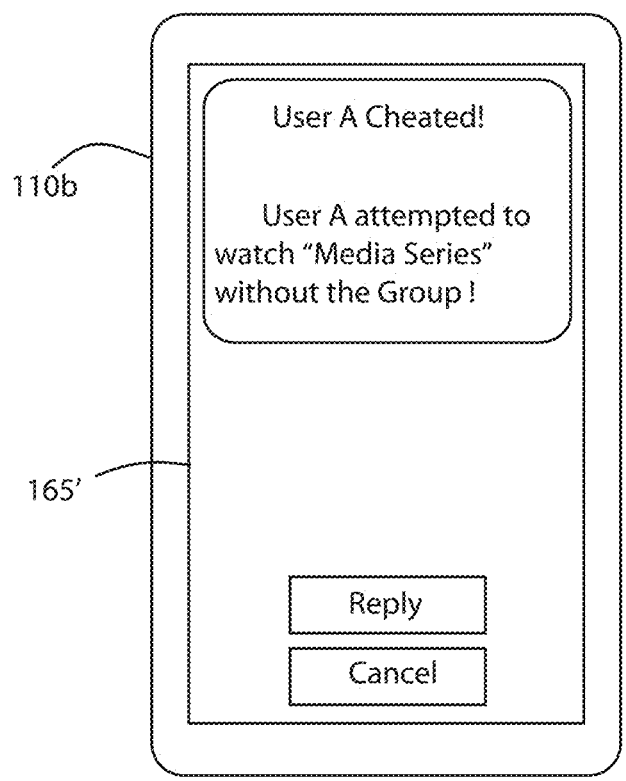
FIG. 11 depicts a graphical user interface of a computing device displaying a notice of playback denial, in accordance with embodiments of the present invention

Referring back to FIG. 1, the computing system 120 includes playback module 134. The playback module 134 includes one or more components of hardware and/or software program for denying the playback request when the playback request violates the rules, or allowing the playback request when the playback request is not in violation of the rules. For instance, the playback module 134 allows a playback if the playback request does not violate any rule of the set of rules, by allowing a transmission of data packets associated with the requested content from a streaming media server 112. The playback module 134 denies a playback request when the playback request from one user of the group by preventing a transmission of data packets to a computing device associated with the account of the requesting user so that the user is prevented from streaming the media series in accordance with the set of rules. In an exemplary embodiment, if all members of the group are not present, the playback module 134 prevents the streaming of the media series to the requesting device so that the user attempting to watch the media series (e.g. a new episode) is denied and must wait for the group, as initially agreed to according to the set of rules. In one embodiment, the set of rules dictates that a notification is sent to the other users in the group that playback has been denied to one of the users. FIG. 11 depicts a graphical user interface 165' of a computing device 110*b* displaying a notice of playback denial, in accordance with embodiments of the present invention. For instance, the notification may alert the other members that a denial of playback has occurred. In the example shown in FIG. 11, the notification states, "User A Cheated! . . . User A attempted to watch "Media Series" without the Group!" The notification optionally includes a selectable icon to reply or cancel the notification. By replying, the user can post a comment directed at the user that "cheated."

Figure 12:
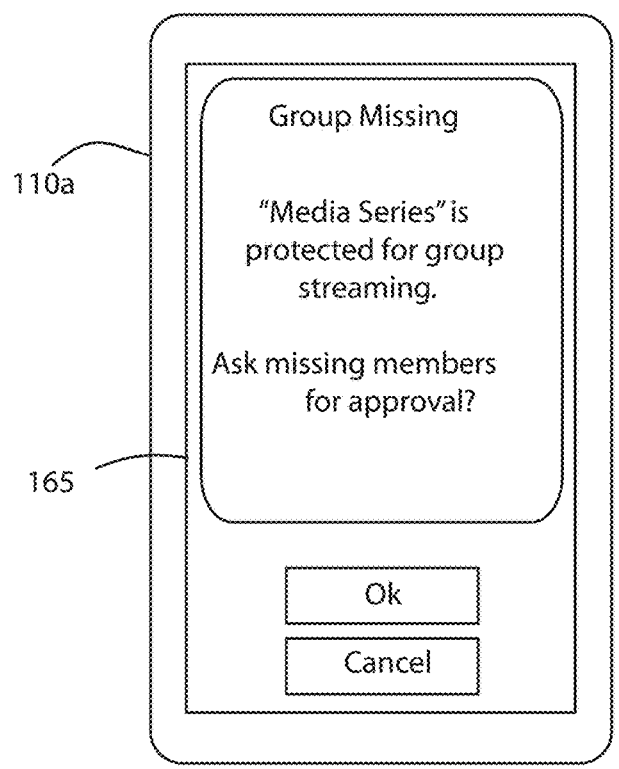
FIG. 12 depicts a graphical user interface of a first user device displaying an option to ask for approval from other members in the group, in accordance with embodiments of the present invention.
Figure 13:
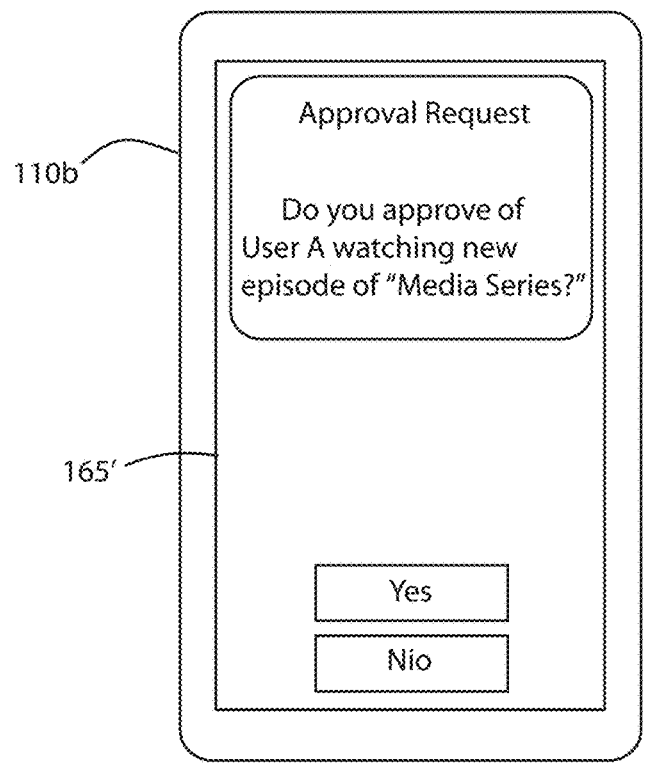
FIG. 13 depicts a graphical user interface of a second user device displaying a prompt on whether to approve a denied playback request, in accordance with embodiments of the present invention.

In response to denying the playback request, the playback module 134 may generate an approval request message to be sent to each computing device 110*b* . . . 110*n* associated with each account of the group of users. FIG. 12 depicts a graphical user interface 165 of a first user device 110*a* displaying an option to ask for approval from other members in the group, in accordance with embodiments of the present invention. As shown in FIG. 12, the playback module 134 generates and sends a message to the first user device 110*a* to prompt the first user to decide whether to ask for approval from other members of the group to watch the media series without the other users. The message shown in FIG. 12 states, "Group Missing . . . "Media Series" is protected for group streaming . . . Ask missing members for approval?" the message also includes one or more selectable options to proceed with asking for approval (e.g. "OK") or not proceed with asking for approval (e.g. "Cancel"). If the first user does not proceed with asking for approval, a message may not be sent to the other members. If the first user proceeds with asking for approval, a message is transmitted by the playback module 134 to the other user devices. FIG. 13 depicts a graphical user interface 165' of a second user device 110*b* displaying a prompt on whether to approve a denied playback request, in accordance with embodiments of the present invention. In the example shown in FIG. 13, a message is sent to the second computing device 110*b* and other devices associated with members of the group, asking to approve or reject a request for approval from a user that was denied a playback because all of the members were not present. In this example, the message states, "Approval Request . . . Do you approve of User A watching new episode of 'Media Series'?" The message includes selectable options to approve ("Yes") or to deny the request ("No"). The playback module 134 allows the playback (e.g. a transmission of data packets to the computing device associated with the account of the user) so that the user can view the media series, when an approval percentage of responses to the approval request message received from other users in the group of users exceeds a threshold dictated by the set of rules. For example, the set of rules can be set to require at least 90%/o of the members to approve the request, or the playback module 134 will not allow the playback of the media series. Various percentages can be set when setting up the rules, as well as excluding the option to allow users to send approval requests.

Furthermore, the set of rules can allow users to override the denial request. For example, in response to denying the playback request, the playback module 134 receives an override command sent from the computing device associated with the account of the user. If override commands are allowed so that a user can "cheat" and force playback of the media series, the playback module 134 allows the playback request even after initially denying the playback request. In an exemplary embodiment, the playback module 134 allows the transmission of data packets to the computing device associated with the account of the user so that the user can view the media series, in response to receiving the override command. In further embodiment, the playback module 134 alerts the other users that the user has overridden a denial of the playback request and violated the set of rules.

Additionally, the playback module 134 can automatically allow "cheating" when a linked user is in a different time zone or a geofence zone away from the group, despite the set of rules. For example, if Mary is in Ireland on vacation, and the rest of the group is in Texas, the playback module 134 can automatically allow Mary to watch due to time zone issues, etc., without requiring a vote. Various automatic allowances can be entered and/or customized by the users.

Various tasks and specific functions of the modules of the computing system 120 may be performed by additional modules, or may be combined into other module(s) to reduce the number of modules. Further, an embodiment of the computer or computer system 120 comprises specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry includes proprietary specially designed components (e.g., a specialized integrated circuit, such as for example an Application Specific Integrated Circuit (ASIC), designed for only implementing methods of the present invention).

Furthermore, the streaming content playback system 100 uses specific rules to determine whether or not to stream data packets to a user device. The specific rules are applied to various circumstances to dictate whether content should or should not be streamed to a user computing device for playback. The rules are unique and tailored at an outset of defining a group of users for group watching streaming media. Without applying the specific set of rules, playback of a media series is only dependent on an internet connection between a streaming media server and the recipient computing device, with no ability to apply rules for each time a playback is requested. The streaming content playback system 100 provides a technical solution to the above-drawbacks by controlling a playback based on a set of rules to monitor and control an operation of a streaming media service, for specific sets of content. The technical solution(s) described herein is necessarily rooted in computer technology in order to overcome a problem specifically arising in the realm of streaming media as a group, based on a set of rules applied by the computing system 120. For instance, without the streaming content playback system 100, a user has no idea if another member of a group that has agreed to watch a specific media series has watched the media series, thereby violating an agreement between members. The streaming content playback system 100 automatically applies rules that modify the operating of a streaming media server and/or streaming media service.

Figure 14:
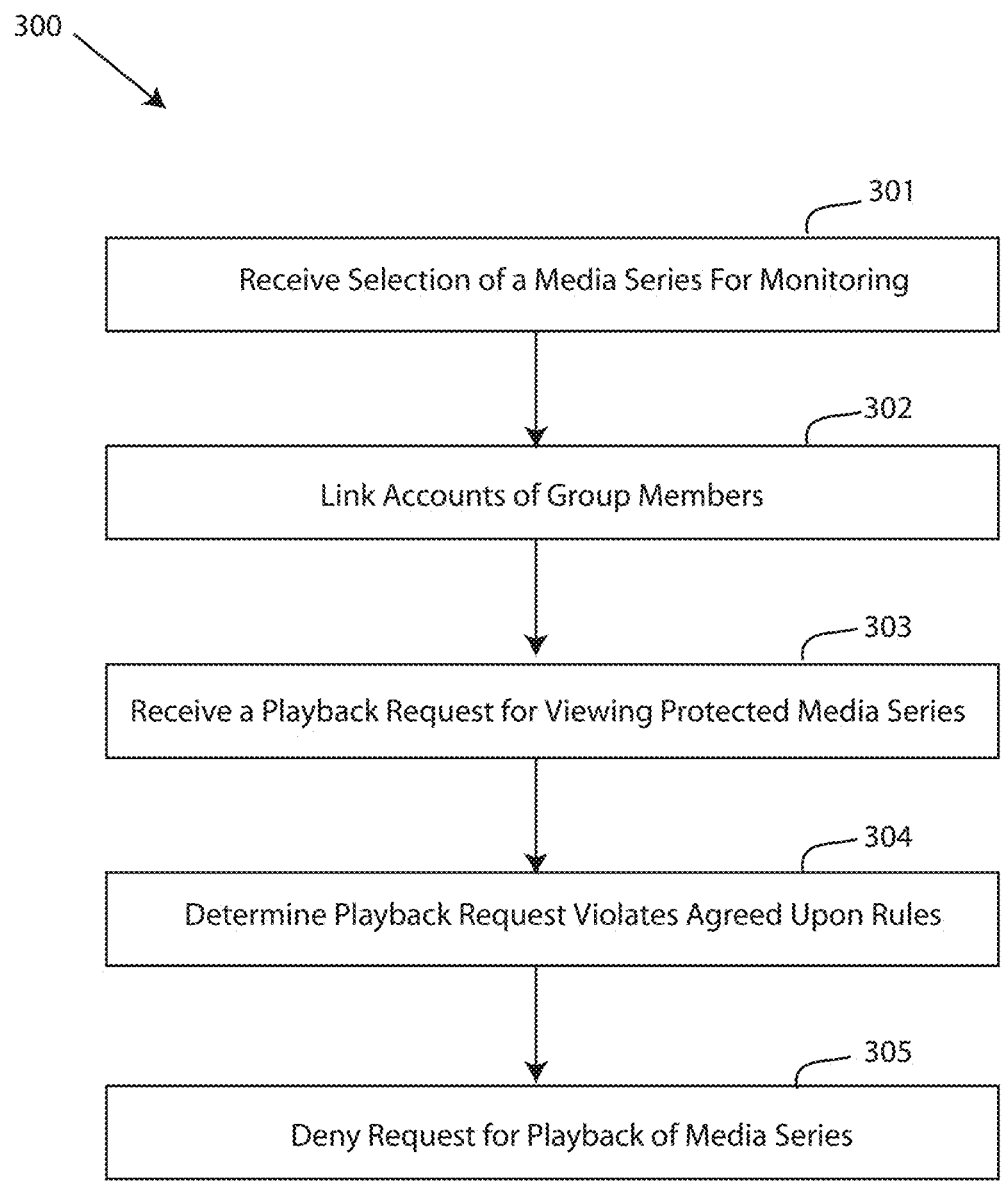
FIG. 14 depicts a flow chart of a method for preventing a playback of streaming media content from a streaming media server based on a set of rules governing playback between a group of users, in accordance with embodiments of the present invention.

Referring now to FIG. 14, which depicts a flow chart of a method 300 for preventing a playback of streaming media content from a streaming media server based on a set of rules governing playback between a group of users, in accordance with embodiments of the present invention. One embodiment of a method 300 or algorithm that may be implemented for preventing a playback of streaming media content from a streaming media server based on a set of rules governing playback between a group of users with the streaming content playback system 100 described in FIGS. 1-13 using one or more computer systems as defined generically in FIG. 16 below, and more specifically by the specific embodiments of FIG. 1.

Embodiments of the method 300 for preventing a playback of streaming media content from a streaming media server based on a set of rules governing playback between a group of users, in accordance with embodiments of the present invention, may begin at step 301 wherein a selection of a media series is received for monitoring. Step 302 links accounts of the group members. Step 303 receives a playback request for viewing a protected media series. Step 304 determines that the playback request violates agreed upon rules. Step 305 denies the playback request of the media series based on the violation of the rules.

Figure 15:
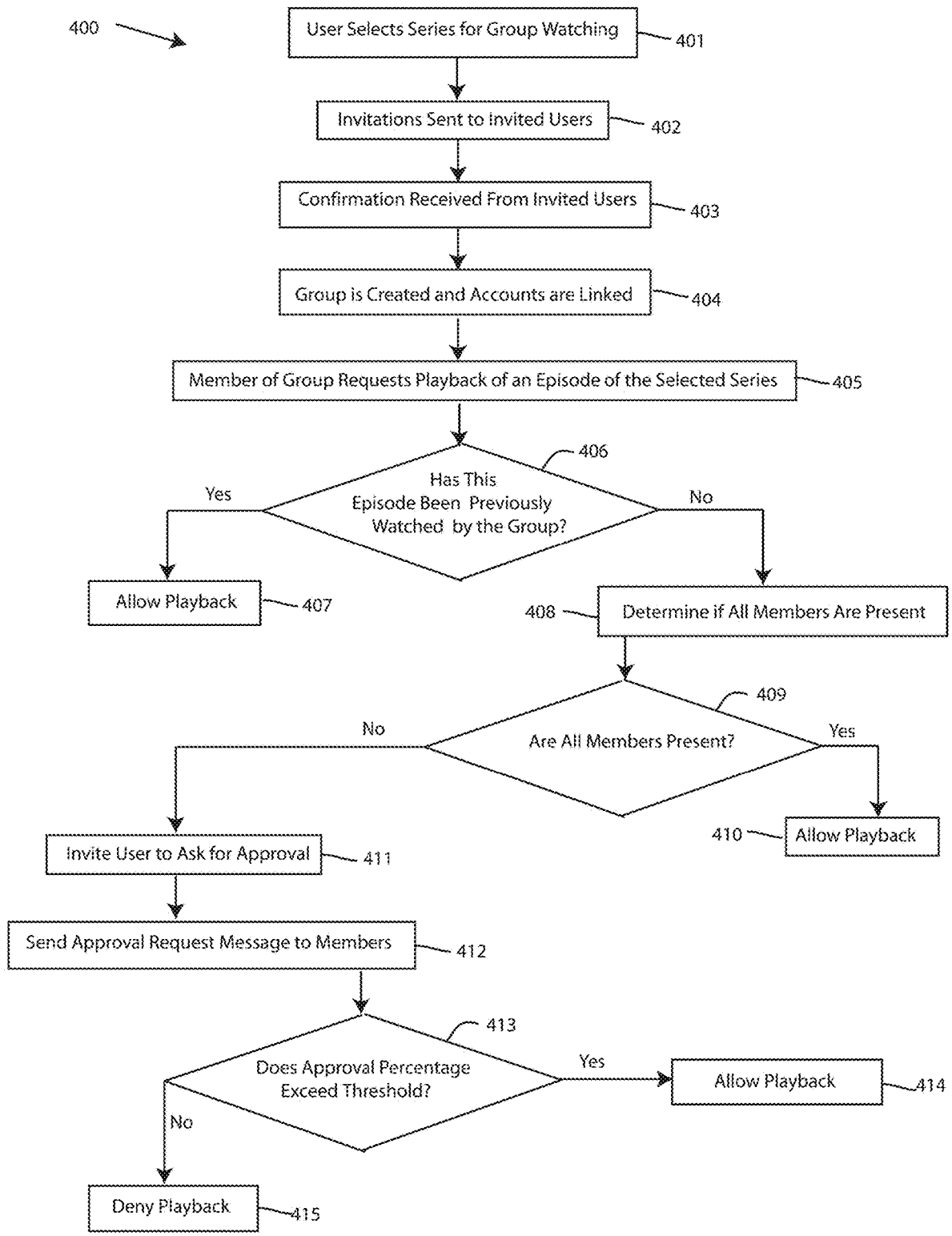
FIG. 15 depicts a detailed flow chart of a for preventing a playback of streaming media content from a streaming media server based on a set of rules governing playback between a group of users, in accordance with embodiments of the present invention.

FIG. 15 depicts a detailed flow chart of a method 400 for preventing a playback of streaming media content from a streaming media server based on a set of rules governing playback between a group of users, in accordance with embodiments of the present invention. At step 401, the user(s) selects a series for group watching. At step 402, invitations are sent to invited users. At step 403, confirmation is received from the invited users. At step 404, a group is created and accounts of the invited users are linked together. At step 405, a request for playback of the media series is received from one of the members of the group. Step 406 determines whether the episode has been previously watched by the group. If yes, then step 407 allows playback of the episode. If no, then step 408 determines if all members are present. Step 409 determines whether all members are present. If yes, then step 410 allows playback. If no, then step 411 invites the user to ask for approval. Step 412 sends an approval request to other members of the group, if the approval is sought; if approval is not sought, playback is denied. Step 413 determines whether an approval percentage exceeds a required threshold. If yes, then step 414 allows playback. If no, then step 415 denies playback.

Figure 16:
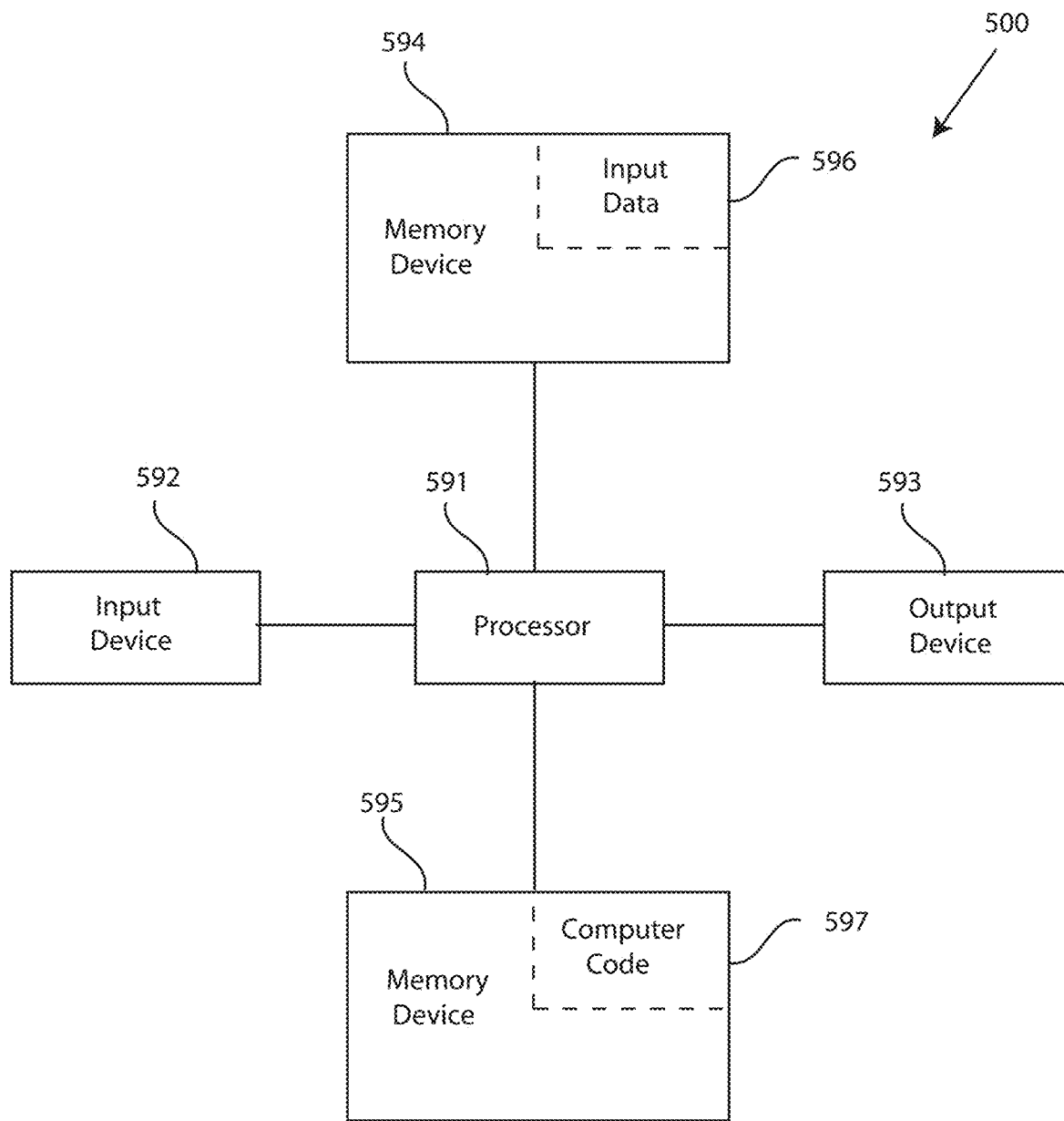
FIG. 16 depicts a block diagram of a computer system for streaming content playback system of FIGS. 1-13, capable of implementing for preventing a playback of streaming media content from a streaming media server based on a set of rules governing playback between a group of users of FIGS. 14-15, in accordance with embodiments of the present invention.

FIG. 16 depicts a block diagram of a computer system for the streaming content playback system 100 of FIGS. 1-13, capable of implementing methods for preventing a playback of streaming media content from a streaming media server based on a set of rules governing playback between a group of users of FIGS. 14-15, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method for preventing a playback of streaming media content from a streaming media server based on a set of rules governing playback between a group of users in the manner prescribed by the embodiments of FIGS. 14-15 using the streaming content playback system 100 of FIGS. 1-13, wherein the instructions of the computer code 597 may be executed by processor 591 via memory device 595. The computer code 597 may include software or program instructions that may implement one or more algorithms for implementing the method for preventing a playback of streaming media content from a streaming media server based on a set of rules governing playback between a group of users, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 16.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system;

and in a third embodiment, the present invention may be a computer program product. Any of the components of the embodiments of the present invention can be deployed, managed, serviced, etc. by a service provider that offers to deploy or integrate computing infrastructure with respect to streaming content playback systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer system 500) including one or more processor(s) 591, wherein the processor(s) carry out instructions contained in the computer code 597 causing the computer system to prevent a playback of streaming media content from a streaming media server based on a set of rules governing playback between a group of users. Another embodiment discloses a process for supporting computer infrastructure, where the process includes integrating computer-readable program code into a computer system 500 including a processor.

The step of integrating includes storing the program code in a computer-readable storage device of the computer system 500 through use of the processor. The program code, upon being executed by the processor, implements a method for preventing a playback of streaming media content from a streaming media server based on a set of rules governing playback between a group of users. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for preventing a playback of streaming media content from a streaming media server based on a set of rules governing playback between a group of users.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 17:
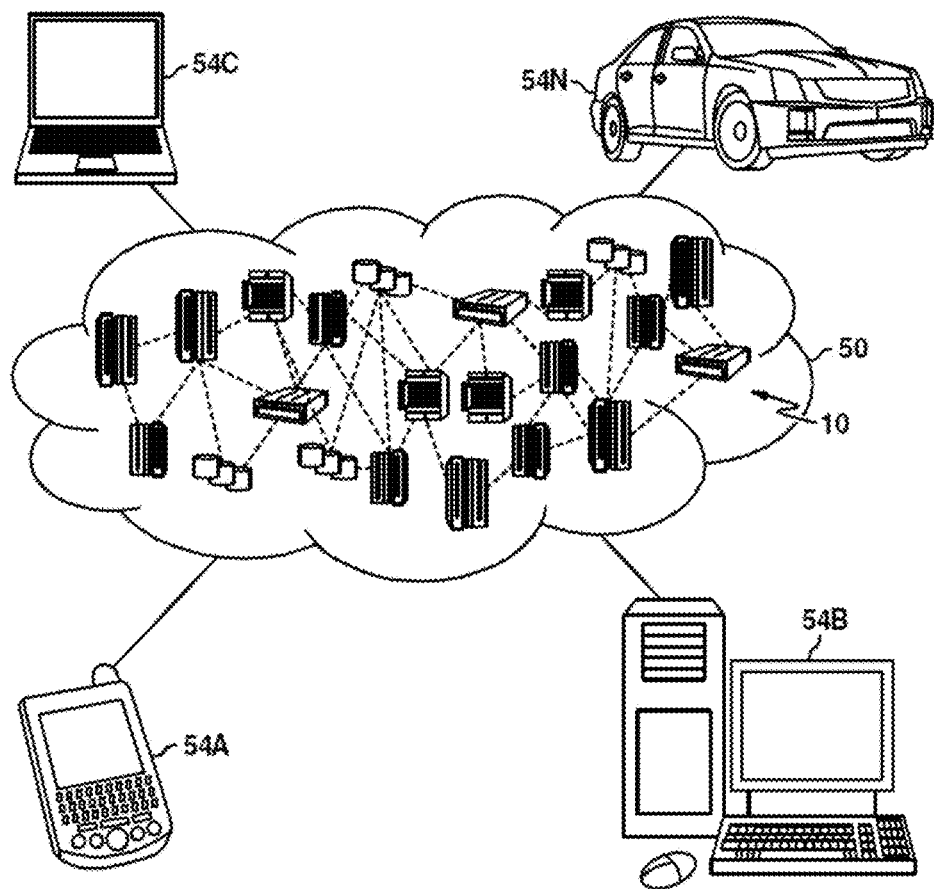
FIG. 17 depicts a cloud computing environment, in accordance with embodiments of the present invention.

Referring now to FIG. 17, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 17 are intended to be illustrative only and that computing nodes 10 and cloud computing environment 50 can communicate with any type of computerized device over any type of network and/or network addressable connection (e.g., using a web browser).

Figure 18:
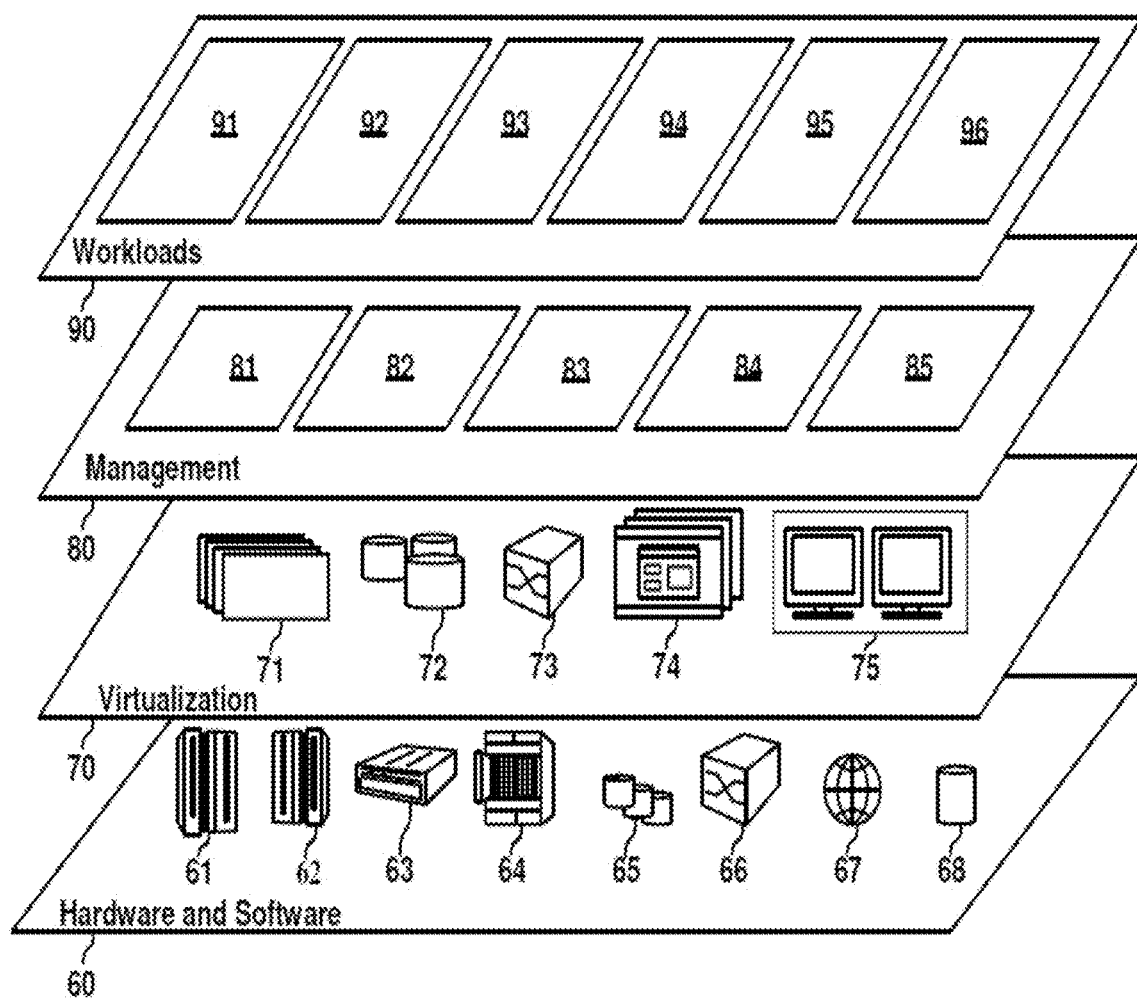
FIG. 18 depicts abstraction model layers, in accordance with embodiments of the present invention.

Referring now to FIG. 18, a set of functional abstraction layers provided by cloud computing environment 50 (see FIG. 17) are shown. It should be understood in advance that the components, layers, and functions shown in FIG. 18 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and GUI and streaming content control 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein

What is claimed is:

1. A method for preventing a playback of streaming media content from a streaming media server based on a set of rules governing playback between a group of users, the method comprising:

receiving, by a processor of a computing system, a selection of a media series available for streaming on a streaming media service to be governed by the set of rules, wherein the selection is received from a plurality of users each having an account with the streaming media service;

linking, by the processor, each account to define the group of users, the group of users including the plurality of users that, by making the selection of the media series, have agreed to playback the media series from the streaming media server according to the set of rules;

receiving, by the processor, a playback request of the media series from a user of the group of users;

determining, by the processor, that the playback request is in violation a rule of the set of rules governing playback of the media series that each of the plurality of users of the group of users must simultaneously view the media series in a same physical location; and denying, by the processor, the playback request from the first user of the group by preventing a transmission of data packets to a computing device associated with the account of the user so that the user is prevented from streaming the media series in accordance with the set of rules.

2. The method of claim 1, further comprising: sending, by the processor, a notification to other users in the group that the first user submitted the playback request in violation of the set of rules.

3. The method of claim 1, wherein the determining that the playback request from the first user is in violation of the rule of the set of rules comprises:

detecting, by the processor, that at least one user in the group of users is not present to simultaneously view the media series, wherein the at least one user in the group of users is not present when a computing device associated with the account of the at least one user in the group is in a different physical location as the user requesting playback, and is not logged in and ready to view the media series in the different physical location.

4. The method of claim 3, wherein the detecting comprises:
  obtaining, by the processor, a location information from each computing device associated with the accounts of the plurality of users of the group of users; and
  ascertaining, by the processor, that the location information of the computing device associated with the account of the at least one user in the group is outside a predetermined proximity to other computing devices associated with other users in the group;
  wherein the computing device being outside the predetermined proximity indicates that all of the plurality of users in the group are not in a same location to simultaneously view the media series together.

5. The method of claim 3, wherein the detecting comprises:
  checking, by the processor, an account login status for each account, wherein the account login status indicates whether the plurality of users are logged in and ready to view the media series;
  ascertaining, by the processor, that the computing device associated with the account of the at least one user in the group is not logged in and ready to view the media series, based on the account login status of the computing device associated with the account of the at least one user in the group;
  wherein the computing device not being logged in indicates that all of the plurality of users in the group are ready to simultaneously view the media series together.

6. The method of claim 1, further comprising:
  in response to denying the playback request, generating, by the processor, an approval request message to be sent to each computing device associated with each account of the group of users; and
  allowing, by the processor, the transmission of data packets to the computing device associated with the account of the user so that the user can view the media series, when an approval percentage of responses to the approval request message received from other users in the group of users exceeds a threshold dictated by the set of rules.

7. The method of claim 1, further comprising:
  in response to denying the playback request, receiving, by the processor, an override command from the computing device associated with the account of the user;
  allowing, by the processor, the transmission of data packets to the computing device associated with the account of the user so that the user can view the media series, in response to receiving the override command; and
  alerting, by the processor, the other users that the user has overridden a denial of the playback request and violated the set of rules.

8. A computing system, comprising:
  a processor;
  a memory device coupled to the processor; and
  a computer readable storage device coupled to the processor, wherein the storage device contains program code executable by the processor via the memory device to implement a for preventing a playback of streaming media content from a streaming media server based on a set of rules governing playback between a group of users, the method comprising:
    receiving, by the processor, a selection of a media series available for streaming on a streaming media service to be governed by the set of rules, wherein the selection is received from a plurality of users each having an account with the streaming media service;
    linking, by the processor, each account to define the group of users, the group of users including the plurality of users that, by making the selection of the media series, have agreed to playback the media series from the streaming media server according to the set of rules;
    receiving, by the processor, a playback request of the media series from a user of the group of users;
    determining, by the processor, that the playback request is in violation of a rule of the set of rules governing playback of the media series that each of the plurality of users of the group of users must simultaneously view the media series in a same physical location; and
    denying, by the processor, the playback request from the first user of the group by preventing a transmission of data packets to a computing device associated with the account of the user so that the user is prevented from streaming the media series in accordance with the set of rules.

9. The computer system of claim 8, further comprising: sending, by the processor, a notification to other users in the group that the first user submitted the playback request in violation of the set of rules.

10. The computer system of claim 8, wherein the determining that the playback request from the first user is in violation of the rule of the set of rules comprises:
  detecting, by the processor, that at least one user in the group of users is not present to simultaneously view the media series, wherein the at least one user in the group of users is not present when a computing device associated with the account of the at least one user in the group is in a different physical location as the user requesting playback, and is not logged in and ready to view the media series in the different physical location.

11. The computer system of claim 10, wherein the detecting comprises:
  obtaining, by the processor, a location information from each computing device associated with the accounts of the plurality of users of the group of users; and
  ascertaining, by the processor, that the location information of the computing device associated with the account of the at least one user in the group is outside a predetermined proximity to other computing devices associated with other users in the group;
  wherein the computing device being outside the predetermined proximity indicates that all of the plurality of users in the group are not in a same location to simultaneously view the media series together.

12. The computer system of claim 10, wherein the detecting comprises:
  checking, by the processor, an account login status for each account, wherein the account login status indicates whether the plurality of users are logged in and ready to view the media series;
  ascertaining, by the processor, that the computing device associated with the account of the at least one user in the group is not logged in and ready to view the media series, based on the account login status of the computing device associated with the account of the at least one user in the group;
  wherein the computing device not being logged in indicates that all of the plurality of users in the group are ready to simultaneously view the media series together.

13. The computer system of claim 8, further comprising:
in response to denying the playback request, generating, by the processor, an approval request message to be sent to each computing device associated with each account of the group of users; and
allowing, by the processor, the transmission of data packets to the computing device associated with the account of the user so that the user can view the media series, when an approval percentage of responses to the approval request message received from other users in the group of users exceeds a threshold dictated by the set of rules.

14. The computer system of claim 8, further comprising:
in response to denying the playback request, receiving, by the processor, an override command from the computing device associated with the account of the user;
allowing, by the processor, the transmission of data packets to the computing device associated with the account of the user so that the user can view the media series, in response to receiving the override command; and
alerting, by the processor, the other users that the user has overridden a denial of the playback request and violated the set of rules.

15. A computer program product, comprising a computer readable hardware storage device storing a computer readable program code, the computer readable program code comprising an algorithm that when executed by a computer processor of a computing system implements a method for preventing a playback of streaming media content from a streaming media server based on a set of rules governing playback between a group of users, the method comprising:
receiving, by the processor, a selection of a media series available for streaming on a streaming media service to be governed by the set of rules, wherein the selection is received from a plurality of users each having an account with the streaming media service;
linking, by the processor, each account to define the group of users, the group of users including the plurality of users that, by making the selection of the media series, have agreed to playback the media series from the streaming media server according to the set of rules;
receiving, by the processor, a playback request of the media series from a user of the group of users;
determining, by the processor, that the playback request is in violation of a rule of the set of rules governing playback of the media series that each of the plurality of users of the group of users must simultaneously view the media series in a same physical location; and
denying, by the processor, the playback request from the first user of the group by preventing a transmission of data packets to a computing device associated with the account of the user so that the user is prevented from streaming the media series in accordance with the set of rules.

16. The computer program product of claim 15, wherein the determining that the playback request from the first user is in violation of the rule of the set of rules comprises:
detecting, by the processor, that at least one user in the group of users is not present to simultaneously view the media series, wherein the at least one user in the group of users is not present when a computing device associated with the account of the at least one user in the group is in a different physical location as the user requesting playback, and is not logged in and ready to view the media series in the different physical location.

17. The computer program product of claim 16, wherein the detecting comprises:
obtaining, by the processor, a location information from each computing device associated with the accounts of the plurality of users of the group of users; and
ascertaining, by the processor, that the location information of the computing device associated with the account of the at least one user in the group is outside a predetermined proximity to other computing devices associated with other users in the group;
wherein the computing device being outside the predetermined proximity indicates that all of the plurality of users in the group are not in a same location to simultaneously view the media series together.

18. The computer program product of claim 16, wherein the detecting comprises:
checking, by the processor, an account login status for each account, wherein the account login status indicates whether the plurality of users are logged in and ready to view the media series;
ascertaining, by the processor, that the computing device associated with the account of the at least one user in the group is not logged in and ready to view the media series, based on the account login status of the computing device associated with the account of the at least one user in the group;
wherein the computing device not being logged in indicates that all of the plurality of users in the group are ready to simultaneously view the media series together.

* * * * *